US010866263B2

(12) United States Patent
Montazeri et al.

(10) Patent No.: US 10,866,263 B2
(45) Date of Patent: Dec. 15, 2020

(54) PLASMONIC ULTRASENSITIVE MULTIPLEX ANALYSIS PLATFORM FOR HYPERSPECTRAL MOLECULAR SENSING

(71) Applicant: The Regents of the University of California, Oakland, CA (US)

(72) Inventors: Arthur Okhtay Montazeri, Berkeley, CA (US); Hoi-Ying N. Holman, Oakland, CA (US); Stefano Cabrini, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/152,204

(22) Filed: Oct. 4, 2018

(65) Prior Publication Data
US 2019/0137540 A1 May 9, 2019

Related U.S. Application Data

(60) Provisional application No. 62/568,718, filed on Oct. 5, 2017.

(51) Int. Cl.
| | |
|---|---|
| *G01N 21/55* | (2014.01) |
| *G01Q 60/38* | (2010.01) |
| *B01L 3/00* | (2006.01) |
| *G01Q 60/22* | (2010.01) |
| *G01N 21/552* | (2014.01) |
| *G01N 21/05* | (2006.01) |

(52) U.S. Cl.
CPC ........ *G01Q 60/38* (2013.01); *B01L 3/502715* (2013.01); *G01N 21/554* (2013.01); *G01Q 60/22* (2013.01); *B01L 2300/0627* (2013.01); *G01N 21/05* (2013.01)

(58) Field of Classification Search
CPC .......... G01N 21/553; B01L 2300/0627; B01L 3/502715; G01J 3/1804; G01Q 60/38; G01Q 60/22; G02B 5/008; G02B 5/18
See application file for complete search history.

(56) References Cited

U.S. PATENT DOCUMENTS

| | | | |
|---|---|---|---|
| 8,208,191 B2* | 6/2012 | Gan | G02B 5/008 359/288 |
| 8,571,640 B2 | 10/2013 | Holman | |
| 9,151,666 B2* | 10/2015 | Amako | G01N 21/658 |
| 9,804,329 B2* | 10/2017 | Montazeri | G02B 6/12007 |
| 2004/0126894 A1* | 7/2004 | Nelson | G01N 33/6848 436/173 |

(Continued)

OTHER PUBLICATIONS

"Contour M CCD camera with display", published at http://www.ir-viewers.com/product/contour-m-ccd-camera/, published on Oct. 4, 2017, retrieved via Wayback Machine at https://web.archive.org/web/20171004135833/http://www.ir-viewers.com/product/contour-m-ccd-camera/ on Apr. 30, 2020 (Year: 2017).*

(Continued)

*Primary Examiner* — Wyatt A Stoffa

(57) ABSTRACT

Plasmonic gratings, along with methods of creating devices using width-graded plasmonic gratings are described. Plasmonic gratings may be transmission-type or closed-ended plasmonic gratings, and may be disposed on detectors to enhance the spectral range detection of the detectors or in further device architectures.

13 Claims, 17 Drawing Sheets

(56) References Cited

U.S. PATENT DOCUMENTS

| | | | | |
|---|---|---|---|---|
| 2004/0155309 | A1* | 8/2004 | Sorin | G01N 21/253 257/433 |
| 2010/0053755 | A1* | 3/2010 | Lee | G02B 5/008 359/577 |
| 2013/0120743 | A1* | 5/2013 | Turker | G01N 21/554 356/128 |
| 2014/0358128 | A1* | 12/2014 | Montazeri | A61M 31/002 604/890.1 |
| 2016/0142654 | A1* | 5/2016 | Vaillancourt | G02B 5/208 348/164 |
| 2017/0138845 | A1 | 5/2017 | Birarda et al. | |

OTHER PUBLICATIONS

Chong, Xinyuan, et al. "On-chip near-infrared spectroscopy of CO2 using high resolution plasmonic filter array." Applied Physics Letters 108.22 (2016): 221106 (Year: 2016).*

Li, Erwen, et al, demonstrate the direction of use of the filter at issue in Fig. 1a. "Broadband on-chip near-infrared spectroscopy based on a plasmonic grating filter array." Optics letters 41.9 (2016): 1913-1916. (Year: 2016).*

Chong, Xinyuan, et al. "On-chip near-infrared spectroscopy of C02 using high resolution plasmonic filter array." Applied Physics Letters 108.22 (2016): 221106 (Year: 2016).*

Holman, et al. "Synchrotron IR Spectromicroscopy: Chemistry of Living Cells." (2010): 8757-8765.

Montazeri et al., "Rainbow-trapping by adiabatic tuning of intragroove plasmon coupling". Optics Express, vol. 24, No. 23, pp. 26745-26755, Nov. 14, 2016.

Atwater et al., "Plasmonics for improved photovoltaic devices". Nature Materials, vol. 9, pp. 205-213, Mar. 2010.

Bao et al., "A colloidal quantum dot spectrometer". Nature, vol. 523, No. 67, pp. 67-70, Jul. 2, 2015.

Hao et al., "Plasmon Resonances of a Gold Nanostar". Nano Letters, vol. 7, No. 3, pp. 729-732, Jan. 18, 2007.

Huang et al., "Plasmonic photothermal therapy (PPTT) using gold nanoparticles". Lasers in Medical Science, vol. 23, pp. 217-228, Aug. 3, 2007.

Khoury et al., "Gold Nanostars for Surface-Enhanced Raman Scattering: Synthesis, Characterization and Optimization". The Journal of Physical Chemistry C, vol. 112, pp. 18849-18859, Aug. 30, 2008.

Lee et al., "Gold and Silver Nanoparticles in Sensing and Imaging: Sensitivity of Plasmon Response to Size, Shape, and Metal Composition". The Journal of Physical Chemistry B, vol. 110, pp. 19220-19225, Aug. 2, 2006.

Linic et al., "Plasmonic-metal nanostructures for efficient conversion of solar to chemical energy". Nature Materials, vol. 10, pp. 911-921, Dec. 2011.

Prodan et al., "Plasmon hybridization in spherical nanoparticles". Journal of Chemical Physics, vol. 120, No. 11, pp. 5444-5454, Mar. 15, 2004.

Sotiriou, "Biomedical applications of multifunctional plasmonic nanoparticles". Wiley Interdisciplinary Reviews: Nanomedicine and Nanobiotechnology, vol. 5, pp. 19-30, Jan./Feb. 2013.

Tsukamoto et al., "Gold Nanoparticles Located at the Interface of Anatase/Rutile TiO2 Particles as Active Plasmonic Photocatalysts for Aerobic Oxidation". Journal of the American Chemical Society, vol. 134, pp. 6309-6315, Mar. 22, 2012.

Willets et al., "Localized Surface Plasmon Resonance Spectroscopy and Sensing". Annual Review of Physical Chemistry, vol. 58, pp. 267-297, 2007.

Xu et al., "Magnetic Core/Shell Fe3O4/Au and Fe3O4/Au/Ag Nanoparticles with Tunable Plasmonic Properties". Journal of the American Chemical Society, vol. 129, pp. 8698-8699, May 1, 2007.

* cited by examiner

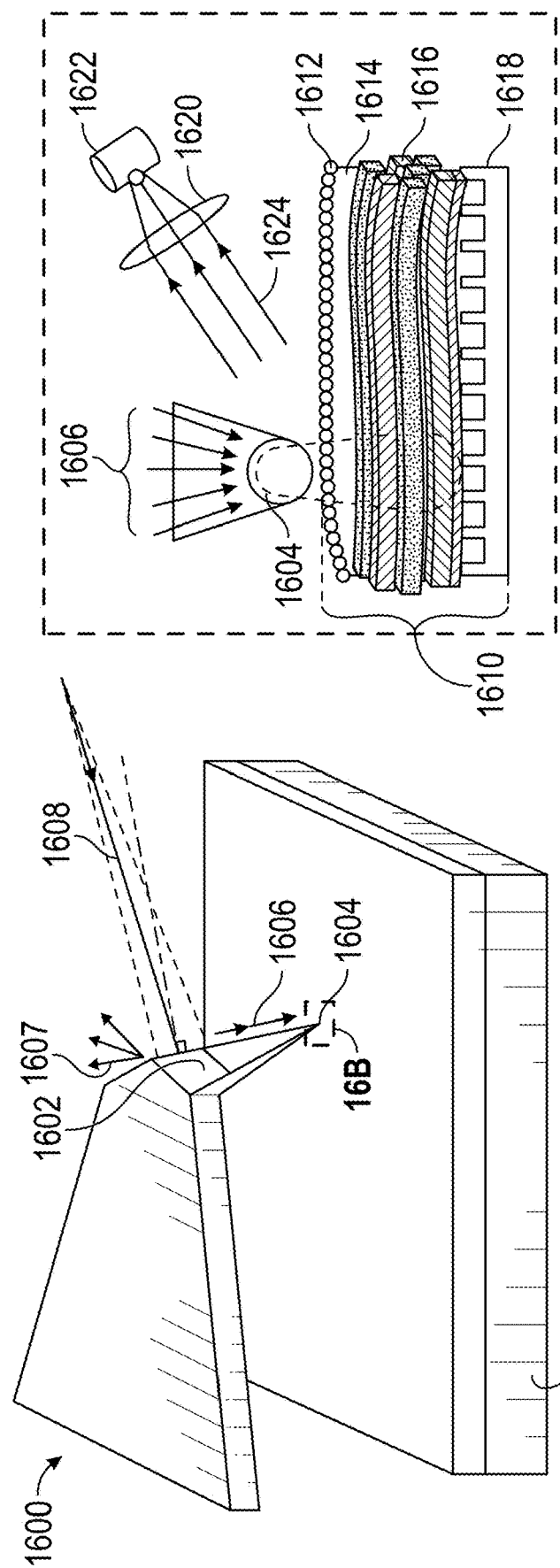

PLASMONIC ULTRASENSITIVE MULTIPLEX ANALYSIS PLATFORM FOR HYPERSPECTRAL MOLECULAR SENSING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 62/568,718, filed Oct. 5, 2017; which is hereby expressly incorporated by reference in its entirety.

STATEMENT REGARDING FEDERALLY SPONSORED R&D

This invention was made with government support under Contract No. DE-AC02-05CH11231 awarded by the U.S. Department of Energy. The government has certain rights in the invention.

BACKGROUND

Field

The present disclosure relates to devices and methods for waveguiding and localizing electromagnetic waves.

Description of the Related Art

When a conductive surface patterned with properly arranged subwavelength features is illuminated by light from a certain range of the electromagnetic spectrum, surface plasmons can be excited. For most metals, this range is in the near-infrared and visible part of the electromagnetic spectrum, where the external field couples to the collective oscillations of the conduction electrons of the metal or a conductor with sufficiently high density of conduction electrons. For simplicity, all such conductors with the real part of their permittivity possessing a negative value are referred to as conductors. At lower electromagnetic frequencies, the near perfect conductivity of the conductor shields the bulk conductor from external radiation and limits coupling. A heuristic approach to circumvent this screening at low frequencies and enhance the penetration of the external fields into the conductor was found through the introduction of deep subwavelength corrugations or alternatively by perforating the surface using subwavelength holes into the surface of the conductor. The resulting modes, dubbed spoof surface plasmons (SSPs), bear resemblance to the visible range plasmonic modes on smooth surfaces where field penetration is significantly more.

It has been shown that such structures are capable of slowing or localizing light when the depth of the corrugations is spatially varied. For example, U.S. Pat. No. 8,208,191, Gan et al., describes a graded metallic grating structure with a graded depth profile, where the grating consists of grooves having a constant width and a spatially varying depth. In another example, in U.S. Pat. No. 9,804,329, Montazeri et al., describes a constant-depth graded metallic grating structure where only the width and/or the spacing vary.

By coupling visible-IR photons to conduction electrons of a metal, plasmonic devices achieve superresolution for many different sensing and imaging applications by managing a narrow band of wavelengths. Yet, simultaneously managing multiple wavelength bands, i.e. hyperspectral response, requires a graded index structure with precisely controlled structural geometry. Existing approaches, which are based on classical resonator theory, achieve a graded-index structure by varying the structure depth.

SUMMARY

Some embodiments described herein generally relate to a device comprising at least one detector and at least one transmission-based plasmonic grating comprising at least two walls, wherein adjacent walls are separated by a cavity, each wall comprises of a thickness, and each cavity comprises of a depth and a width, wherein the plasmonic grating is disposed on the detector and wherein the wall thickness, cavity depth, and cavity width of the resonant plasmonic structure is tuned to absorb electromagnetic radiation and excite surface plasmons.

In one aspect, a device is provided. The device includes at least one detector. The device further includes at least one transparent plasmonic grating comprising at least two walls. The device further includes wherein adjacent walls are separated by a cavity, each wall comprises of a thickness, and each cavity comprises a depth and a width. The device further includes wherein the plasmonic grating is disposed on the detector and wherein the wall thickness, cavity depth and cavity width of the resonant plasmonic structure is tuned to absorb electromagnetic radiation and excite surface plasmons.

In some embodiments, the plasmonic grating is metallic. In some embodiments, the metallic material of the plasmonic grating is selected from the group consisting of gold, silver, aluminum, and combinations thereof. In some embodiments, the plasmonic grating is tuned to the infrared electromagnetic radiation range.

In some embodiments, the plasmonic grating is about 2-10 µm in length. In some embodiments, the cavity width of the plasmonic grating ranges from about 10 nm to about 300 nm. In some embodiments, the cavity depth of the plasmonic grating ranges from about 500 nm to about 20 µm. In some embodiments, the cavity depths of each of the at least one plasmonic gratings are approximately uniform. In some embodiments, the wall thickness of the plasmonic grating ranges from about 10 nm to about 300 nm.

In some embodiments, the detector is an infrared detector. In some embodiments, the detector comprises at least one pixel. In some embodiments, the at least one pixel senses infrared electromagnetic radiation. In some embodiments, the detector comprises at least one of a low frequency infrared pixel, a medium frequency infrared pixel and a high frequency infrared pixel, wherein the low frequency infrared pixel absorbs electromagnetic radiation in about the $\lambda \geq 10$ µm spectral region, wherein the medium frequency infrared pixel tuned to absorb electromagnetic radiation in about the $5 \text{ µm} \leq \lambda \leq 10 \text{ µm}$ spectral region, and wherein the high frequency infrared pixel tuned to absorb electromagnetic radiation in about the $\lambda \leq 5$ µm spectral region. In some embodiments, the plasmonic grating covers about 10 pixels when disposed on the detector.

In some embodiments, the device comprises a plurality of plasmonic gratings. In some embodiments, the plurality of plasmonic gratings are tuned to at least one infrared resonant frequency of a target compound. In some embodiments, the plurality of plasmonic gratings are tuned to more than one infrared resonant frequency of the target compound. In some embodiments, the plurality of plasmonic gratings are tuned to the infrared resonant frequencies of more than one target compound. In some embodiments, the target compound is an organic compound. In some embodiments, the target compound is an inorganic compound.

In some embodiments, the plasmonic grating is rectangular. In some embodiments, the plasmonic grating is cylindrical.

In some embodiments, the device further comprises a light source. In some embodiments, the device further comprises a microfluidic channel comprising a microfluidic channel cavity configured to contain an analyte, wherein the plasmonic grating is in contact with the microfluidic channel. In some embodiments, the entirety of the plasmonic grating is within the microfluidic channel cavity such that the plasmonic grating is configured to come into contact with the analyte during the operation of the device.

In some embodiments, the device further comprises a sample holder comprising at least one bin configured to contain an analyte, wherein the at least one plasmonic grating is in contact with the sample holder. In some embodiments, the entirety of the plasmonic grating is within the bin such that the plasmonic grating is configured to come into contact with the analyte during the operation of the device.

In another aspect, a device is provided. The device includes a probe comprising a probe tip. The device further includes at least one transparent plasmonic grating comprising at least two walls, wherein adjacent walls are separated by a cavity each wall comprises of a thickness, and each cavity comprises a depth and a width. The device further includes wherein the plasmonic grating is disposed on the probe. The device further includes wherein the wall thickness, cavity depth and cavity width of the resonant plasmonic structure is tuned to absorb electromagnetic radiation and excite surface plasmons and propagate the surface plasmons to the probe tip.

In some embodiments, the device further comprises a sample containing an analyte, wherein the probe tip is configured to deliver an energy from the surface plasmons to the analyte. In some embodiments, the device further comprises a detector, wherein the detector is configured to detect a signal from the analyte.

BRIEF DESCRIPTION OF THE DRAWINGS

FIG. 16A depicts one embodiment of a plasmonic nanofocusing probe comprising a plasmonic grating structure used on a nanofluidic platform.

FIG. 16B is a magnified depiction of the probe tip and nanoluidic platform shown in FIG. 16A.

DETAILED DESCRIPTION

Figure 1:
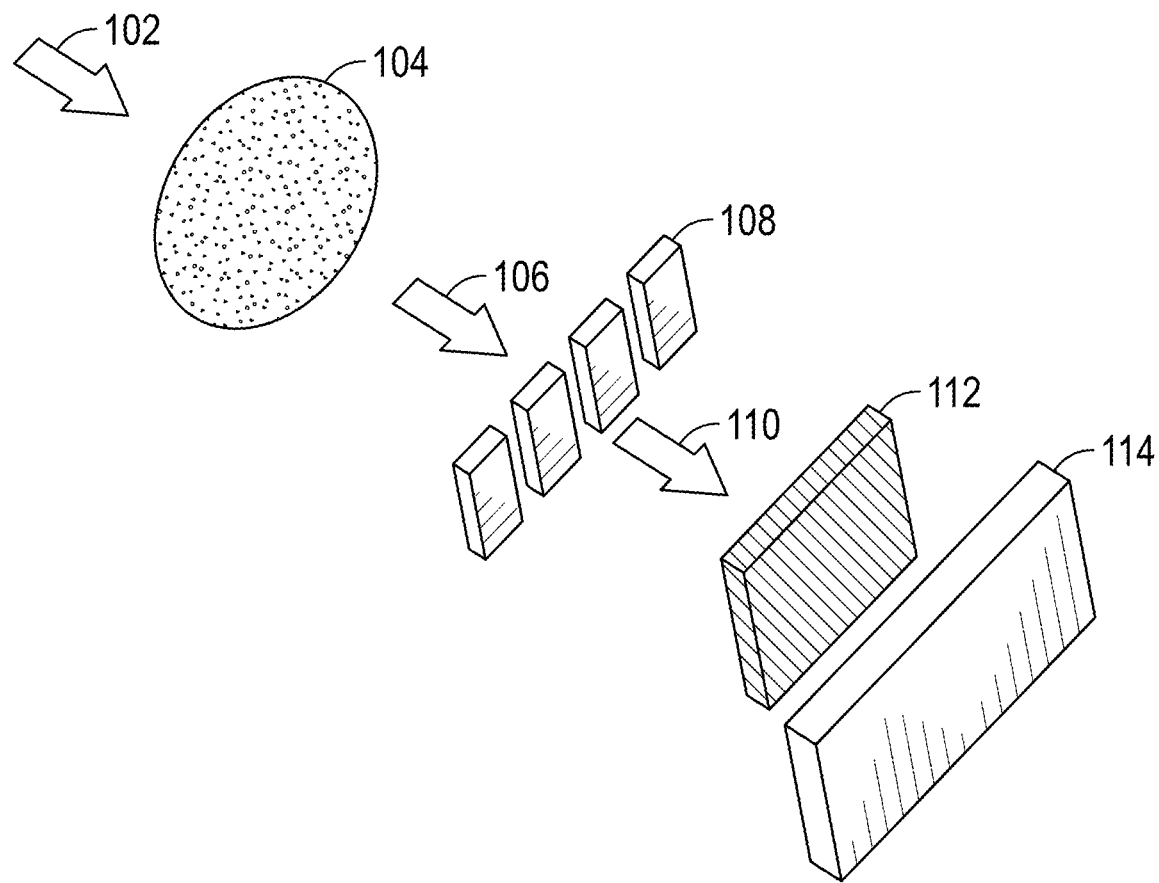
FIG. 1 is an exploded schematic demonstrating the operation of a camera comprising a plasmonic grating.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise stated, the terms "about" and "approximately" mean plus or minus 25 percent or less.

As used herein, the term "dielectric" refers to any polarizable non-conductive medium, including air.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As used herein, the phrase "subwavelength" refers a feature having a characteristic size or dimension that is less than the free-space wavelength of light that is incident on a device or structure.

Embodiments relate to planar plasmonic gratings of uniform depth that, unlike existing designs, are amenable to scalable fabrication. In one embodiment, devices fabricated with tapering only groove or cavity widths resulted in an adiabatic index gradient for guiding the propagation of plasmonic modes. Each plasmonic mode propagated over the grating until it reached a groove of matching resonance where it was trapped and localized. Collectively, a broadband incident light maps onto plasmonic modes of corresponding frequency and localized in different spatial locations, forming a "hyperspectral rainbow" over the uniform-depth structure. We discovered that our results corroborate with those reported for classical depth-varying structures. Thus, the embodiments of planar plasmonic gratings described herein offer a viable path towards chip-compatible light management for hyperspectral sensing and imaging devices.

One embodiment is a planar grating comprising light-trapping on constant-depth plasmonic nanogrooves operating in the visible to infrared range (about 400 nm to about 13 µm), in both near- and far-field configurations. These adiabatically tailored plasmonic gratings, comprised of weakly-coupled nano-grooves, were found to excite and guide surface plasmons until each spectral component encounters a resonant groove of corresponding resonance, whereupon its group velocity slows down. This manner of slowing down photons spatially untangles the frequencies of a broadband light source (photon sorting) and forms a hyperspectral rainbow on the grating surface. Moreover, the spatial distribution of each wavelength over the grating was deeply subwavelength due to the nanometer width of grooves, thereby enabling the spatial location with super-resolution accuracy. The gratings provide an ultra-broadband detection capability that spans the visible-IR range and can be custom-tailored for specific chemicals of interest.

A major challenge in hyperspectral light-trapping, for slowing down the group velocity of light, arises from the criterion that each wavelength must have a matching resonant structure. For example, in the case of Fabry-Perot type resonators, each resonator is fabricated by altering the length of the cavity, herein referred to as a depth-graded plasmonic grating. For a collection of vertical Fabry-Perot resonators forming a diffraction grating, this translates into a groove-depth gradient across the grating which poses a major nanofabrication challenge. In contrast, a width-based gradient approach, operates by changing the effective mode index of the grooves, while keeping the groove depth constant, herein referred to a width-graded plasmonic grating. Embodiments of width-graded plasmonic gratings are shown in FIGS. 5, 6, 8-10 and 12A-13B.

In one embodiment, each groove is bounded and is modeled as a metal-insulator-metal (MIM) waveguide with constant depth gratings. In such constant-depth gratings, the width-dependent groove waveguide dispersion coupled with the cavity resonance gives rise to the generalized resonant dispersion of the groove. Under the conditions that the width dependence of this resonant-dispersion is noticeable (Montazeri, Arthur O., et al. "Rainbow-trapping by adiabatic tuning of intragroove plasmon coupling." *Optics express* 24.23 (2016): 26745-26755), the local effective index of the groove varies as a function of width, resulting in:

$$n_{\text{eff}} = \sqrt{\frac{\alpha^2 \epsilon_1 \epsilon_2^2 - \epsilon_1^2 \epsilon_2}{\alpha^2 \epsilon_2^2 - \epsilon_1^2}},.$$

Where $\alpha=\tan h((k_1 w)/2)$ for brevity, $k_1$ is the components of the k-vector perpendicular to the intragroove surface, w is the groove width, which varies along the light propagation direction, and permittivity $\epsilon_1$ of the dielectric within grooves, and a metal cladding with permittivity of $\epsilon_2$. Gratings fabricated using this approach are amenable to mass production using template stripping, nano-imprint etc. As described below, embodiments of plasmonic gratings described herein may be used for hyperspectral super resolution sensing.

Coupled Resonant Plasmonic Structures

Embodiments include subwavelength plasmonic structures for controlling light propagation and localization among a series of unit plasmonic resonators. In various embodiments, plasmonic structures are described that include a series of subwavelength unit plasmonic resonators that are spatially arranged to support the coupling of electromagnetic waves among neighboring unit resonators, which is henceforth referred to as "inter-resonator coupling".

A "unit plasmonic resonator", as described herein, refers to an excitable resonant structure having a dielectric region formed between adjacent conductive surfaces, thereby forming a resonant cavity that is excitable via electromagnetic radiation. A unit plasmonic resonator may have a resonant feature that extends in one, two, or three dimensions. Referring to the unit plasmonic resonator, each of the adjacent conductive surfaces can be described as comprising a thickness, and each cavity can be described as comprising a depth and a width.

According to various example embodiments described herein, plasmon devices or "plasmonic gratings" may be provided whereby a support structure includes a plurality of unit plasmon resonators, where the geometry and/or the resonance frequency of the resonator may different among unit plasmonic resonators. Accordingly, several unit plasmonic resonators with differing characteristics may be present, and a coupling may or may not exist between a pair or pairs of the unit resonators. In some embodiments, the plasmonic grating may comprise unit plasmonic resonators of approximately uniform cavity depths. In some embodiments, the plasmonic grating may comprise unit plasmonic resonators of approximately uniform cavity widths. In some embodiments, the plasmonic grating may comprise unit plasmonic resonators of approximately uniform conductive surface thicknesses. In some embodiments, the plasmonic grating may comprise unit plasmonic resonators of varying cavity depths. In some embodiments, the plasmonic grating may comprise unit plasmonic resonators of varying cavity widths. In some embodiments, the plasmonic grating may comprise unit plasmonic resonators of varying conductive surface thicknesses.

The coupled nature of the adjacent unit plasmonic resonators of a plasmonic structure results in the spatial transfer of electromagnetic wave energy from one unit plasmonic resonator, near the surface of the resulting extended structure, or, as described below, the transfer of electromagnetic energy between adjacent unit plasmonic resonators may alternatively or additionally occur through the conductive surface or surfaces provided between adjacent unit plasmonic resonators. Such a structure is henceforth referred to as a "coupled resonant plasmonic structure". An example of a unit plasmonic resonator is a groove (also referred to herein as a slit or corrugation) formed within a conductive structure and/or bounded by a conductive surface.

Multiply-Coupled Resonant Plasmonic Structures

In some embodiments, the unit plasmonic resonators may be configured to support intra-resonator plasmonic coupling between multiple surface plasmons such that the dispersion relation of a coupled resonant plasmonic structure is modified. For example, when the adjacent conductive surfaces forming a unit plasmonic resonator are placed within close proximity of each other, the surface plasmon modes associated with the adjacent surfaces can become coupled through the coupling provided by the overlap of the evanescent fields of the surface plasmon modes between two or more conductor-insulator interfaces of the unit plasmonic resonator. Accordingly, the electromagnetic waves interacting with such structures involve the formation of coupled surface plasmons, as opposed to merely "spoof surface plasmons", as previously described by others, which refers to the enhanced field penetration into the surface of the conductor through perforating or grating of the surface. Furthermore, without intending to be limited by theory, it is expected that such coupled surface plasmons within a unit plasmonic resonator may be excited beyond the electromagnetic frequencies normally associated with plasmon generation, for example, farther into the infrared. Henceforth any medium with a negative-valued real part of the permittivity below a prescribed frequency is referred to as a conductive medium. For metals, this condition is satisfied below the bulk plasmon frequency.

Accordingly, in some embodiments, a unit plasmonic resonator having two or more adjacent conductive surfaces may be configured such that the adjacent conductive surfaces are sufficiently close to facilitate coupling between surface plasmons associated with each conductive surface forming the unit plasmonic resonator. Accordingly, a unit plasmonic resonator may have at least one dimension that is sufficiently small to result in strong intra-resonator coupling between adjacent conductive surfaces.

It will be understood that the phrase "adjacent conductive surfaces" may refer to several different geometric configurations of the conductive surfaces. In one example, planar surface segments may be spatially separated by a dielectric, such as in the case of a resonant plasmonic structure having a linear (e.g. one dimensional) array of unit plasmonic resonators (e.g. a corrugated resonant device) where the unit plasmonic resonators are formed between adjacent planar conductive surfaces. In another example, a unit plasmonic resonator may be formed having a longitudinal extend and closed cross-section, such as a longitudinally extended dielectric segment that having a conductive lateral surface (and one or more open ends or apertures to facilitate coupling between adjacent resonators and/or to propagate electromagnetic energy). For example, the unit plasmonic resonator may have a square or rectangular cross section (or a cross-section having another polygonal shape characterized by opposing sides), where intra-resonator coupling occurs between one or more pairs of opposing sides (depending on the manner in which the unit plasmonic resonators are spatially arranged, and/or depending on the direction and/or polarization of the incident electromagnetic energy). It will be understood that the geometry of a unit plasmonic resonator having a closed cross-section need not be polygonal, but could be any oblong shape (such as an ellipse) that can characterized by opposing surface segments.

Analytes

Plasmonic gratings described herein may be used in the detection or characterization of analytes. In some embodiments, the analyte may be an organic material. In some embodiments, the analyte may be an inorganic material. In some embodiments, the analyte may be in the gaseous phase. In some embodiments, the analyte may be in a liquid phase. In some embodiments, the analyte may be in in a solid phase. In some embodiments, the analyte may be isolated in a laboratory setting. In some embodiments, the analyte may be dispersed in an environment. In another embodiments, the analyte may be in a mesophase.

Analyte Signal

Plasmonic gratings described herein may be tuned to be used in the detection or characterization of analyte signals, such as photons given off by the analyte. In some embodiments, the plasmonic grating is tuned to analyte signals in the infrared to visible light regions. In some embodiments, the plasmonic grating is tuned to analyte spectral signals with wavenumbers from 500 $cm^{-1}$ to 30000 $cm^{-1}$. In some embodiments, the plasmonic grating is tuned to analyte signals with wavenumbers from 500 $cm^{-1}$ to 6000 $cm^{-1}$. In some embodiments, the plasmonic grating is tuned to analyte signals with wavenumbers from 6000 $cm^{-1}$ to 30000 $cm^{-1}$. In some embodiments, the plasmonic grating is tuned to an analyte's infrared overtone frequencies. In some embodiments, the plasmonic grating is tuned to an analyte's infrared harmonic frequencies. In some embodiments, the plasmonic grating is tuned to an analyte's infrared resonant or vibrational frequencies. In some embodiments, the plasmonic grating is tuned to an analyte's combination frequencies. In some embodiments, multiple plasmonic gratings are tuned to multiple signals of an analyte.

Plasmonic Grating Materials

Plasmonic gratings described herein may be composed of any plasmonically active materials. In some embodiments, the composition of a plasmonic grating may comprise of at least one metal. In some embodiments, the composition of a plasmonic grating may comprise of at least one noble metal. In some embodiments, the composition of a plasmonic grating may comprise of gold. In some embodiments, the composition of a plasmonic grating may comprise of silver. In some embodiments, the plasmonic grating may be metallic.

Detector and Plasmonic Grating

Plasmonic gratings described herein may be coupled to a detector. In some embodiments, the plasmonic grating may be disposed on a detector. In some embodiments, a detector may be within the cavity of at least one unit plasmonic resonator of the plasmonic grating.

A person of ordinary skill in the art would understand that any suitable detector may be used in coupling a plasmonic grating to such a device. In some embodiments, the detector may be a complementary metal-oxide-semiconductor (CMOS). In some embodiments, the detector may be a charge-coupled device (CCD).

Use of Device with Detector and Plasmonic Grating

A device with at least one plasmonic grating coupled to a detector may be able to detect photons in multiple spectral regions simultaneously. Such a device may be used to overlay the data from one spectral range with the data from another spectral range. In some embodiments, a visible light photograph may be overlaid with infrared data. In some embodiments, a ultraviolet light photograph may be overlaid with infrared data.

A person of ordinary skill in the art would appreciate the advantages of such a device, such as the compactness of such a device able to overlay the data of multiple spectral ranges.

FIG. 1 illustrates one embodiment of an exploded view of the operation of a detector from FIG. 1 comprising at least one plasmonic grating. An electromagnetic source 102 excites an analyte 104, which in turn gives off a signal 106. The signal 106 is absorbed by a transmission-type plasmonic grating 108, which guides the plasmonic signal 110 to a detector 112. The plasmonic grating 108 is disposed on the detector 112, and the detector 112 is disposed on the substrate.

Figure 2:
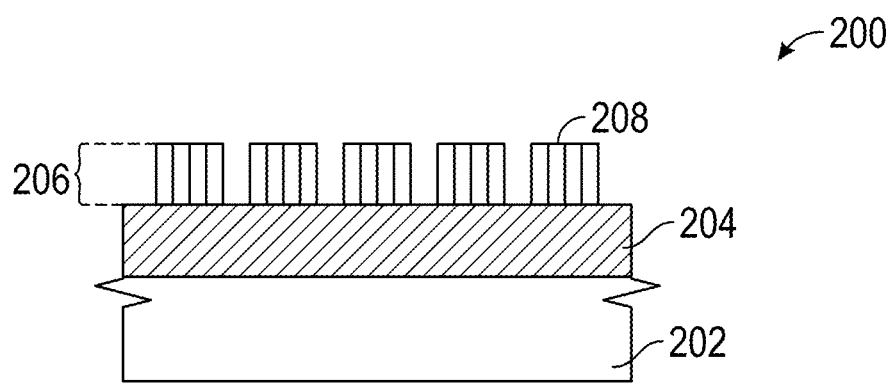
FIG. 2 is a cross-sectional side view schematic of a plasmonic grating disposed on a detector.

FIG. 2 illustrates one embodiment of a cross-sectional portion of a plasmonic device 300 viewed from the side. The device 200 comprises a bottom substrate layer 202, a middle detector layer 204, and a top plasmonic grating array layer 206 with multiple single plasmonic gratings 208 disposed over the detector 204. Each single plasmonic grating 208 may be tuned independently to absorb electromagnetic radiation of its own frequency.

Figure 3:
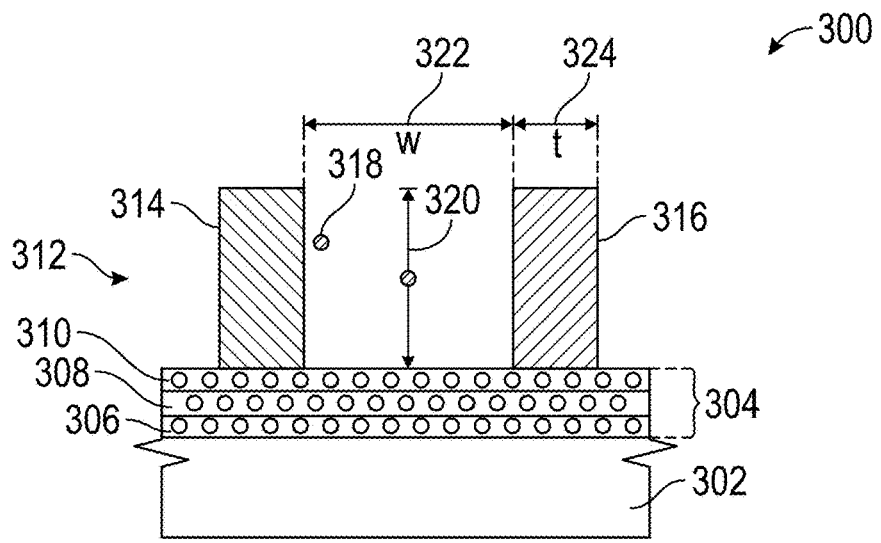
FIG. 3 is a cross-sectional side view schematic of a plasmonic grating disposed on a detector shown with pixels.

FIG. 3 illustrates one embodiment of a cross-sectional portion of a device 300 viewed from the side, showing a single unit plasmonic resonator 312. The device 300 comprises a bottom substrate layer 302, a middle detector layer 304, and a top unit plasmonic resonator layer 312. The detector layer 304 further comprises a bottom detector layer 306 for wavelengths of about $\lambda \geq 10$ μm, a middle detector layer 308 for wavelengths of about 5 μm$\leq\lambda\leq$10 μm, and a top detector layer 310 for wavelengths of about $\lambda \leq 5$ μm. The unit plasmonic resonator 312 comprises a first wall 314 and a second wall 316, wherein a cavity 318 is formed between the first wall 314 and the second wall 316. The unit plasmonic resonator 312 is characterized by a cavity depth (d) 318 measured from the top of the first 312 and second wall 314 to the detector 304, a cavity width (w) 322 measured by the distance between the first 314 and second walls 316, and a wall thickness (t) 324.

Figure 4:
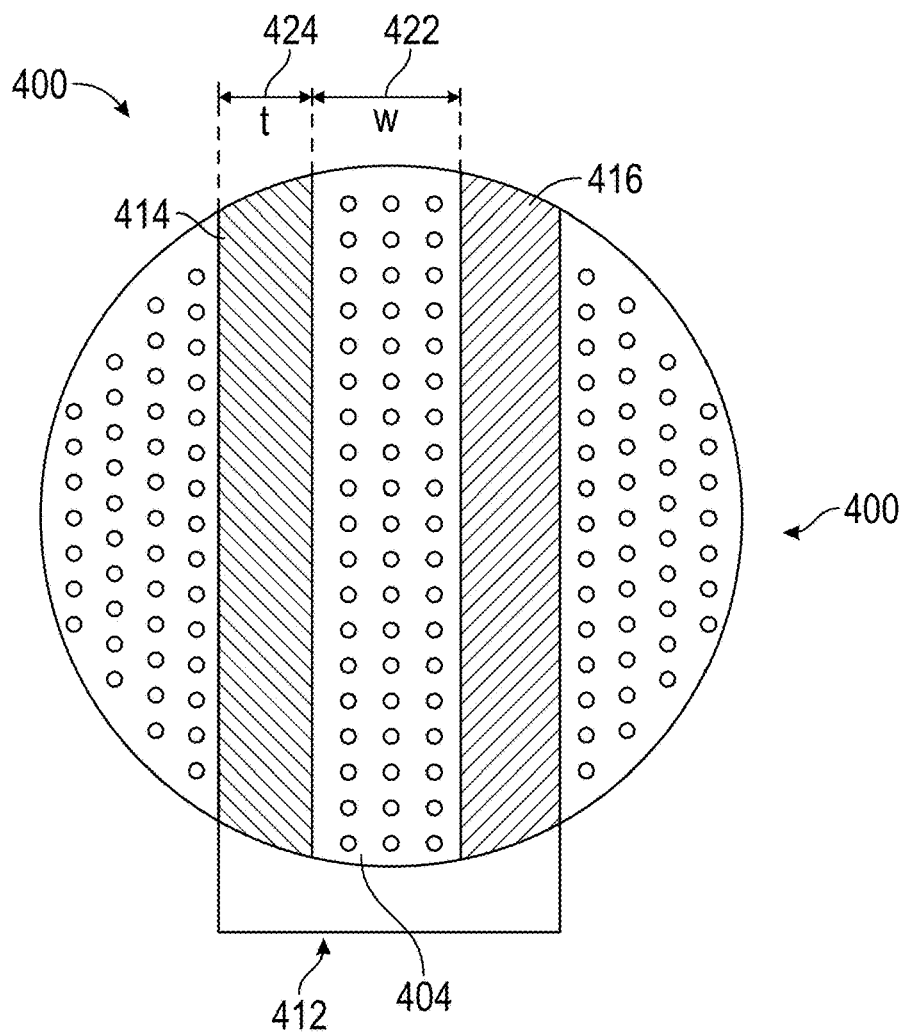
FIG. 4 is a top plane view schematic of a plasmonic grating disposed on a detector shown with pixels.

FIG. 4 illustrates one embodiment of a portion of a device 400 viewed from the top. A detector 404 comprises a unit plasmonic resonator 412 over the detector 404. The unit plasmonic resonator 412 is characterized by a cavity width (w) 422 measured by the distance between the first 414 and second walls 416, and a wall thickness (t) 424.

Figure 5:
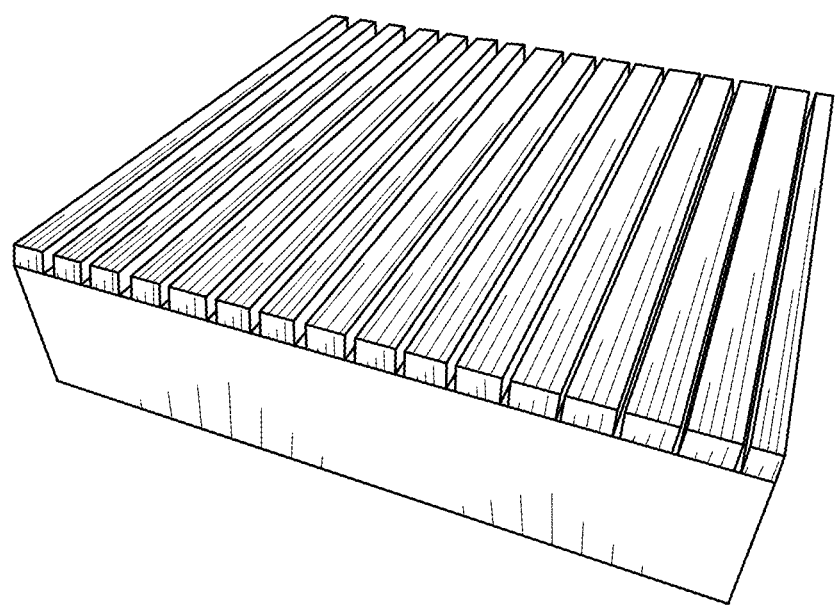
FIG. 5 is a top view schematic of a transmission-type width-graded plasmonic grating disposed on a substrate or a detector element.
Figure 6:
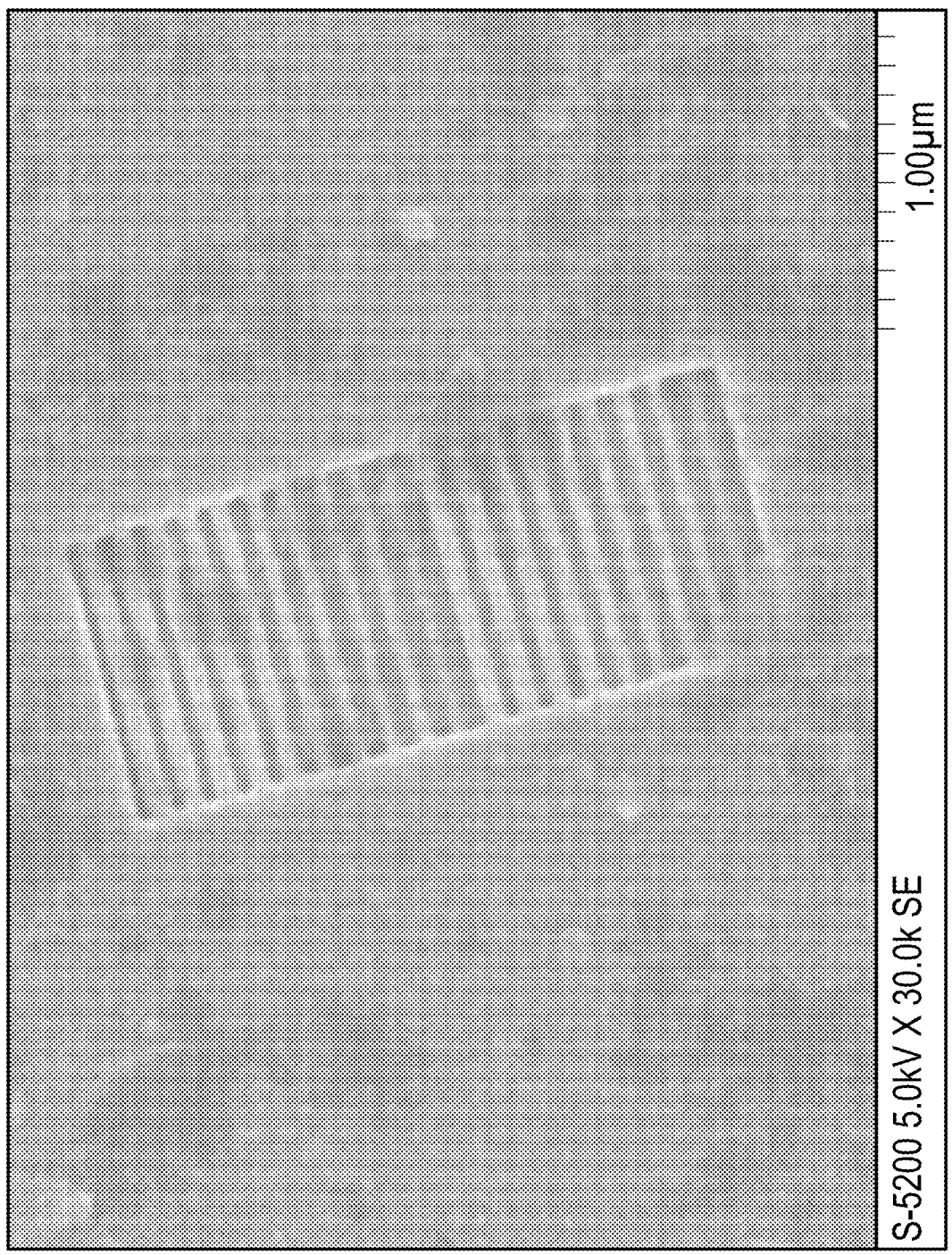
FIG. 6 is an SEM image of a single linear plasmonic grating formed using electron beam lithography.
Figure 7:
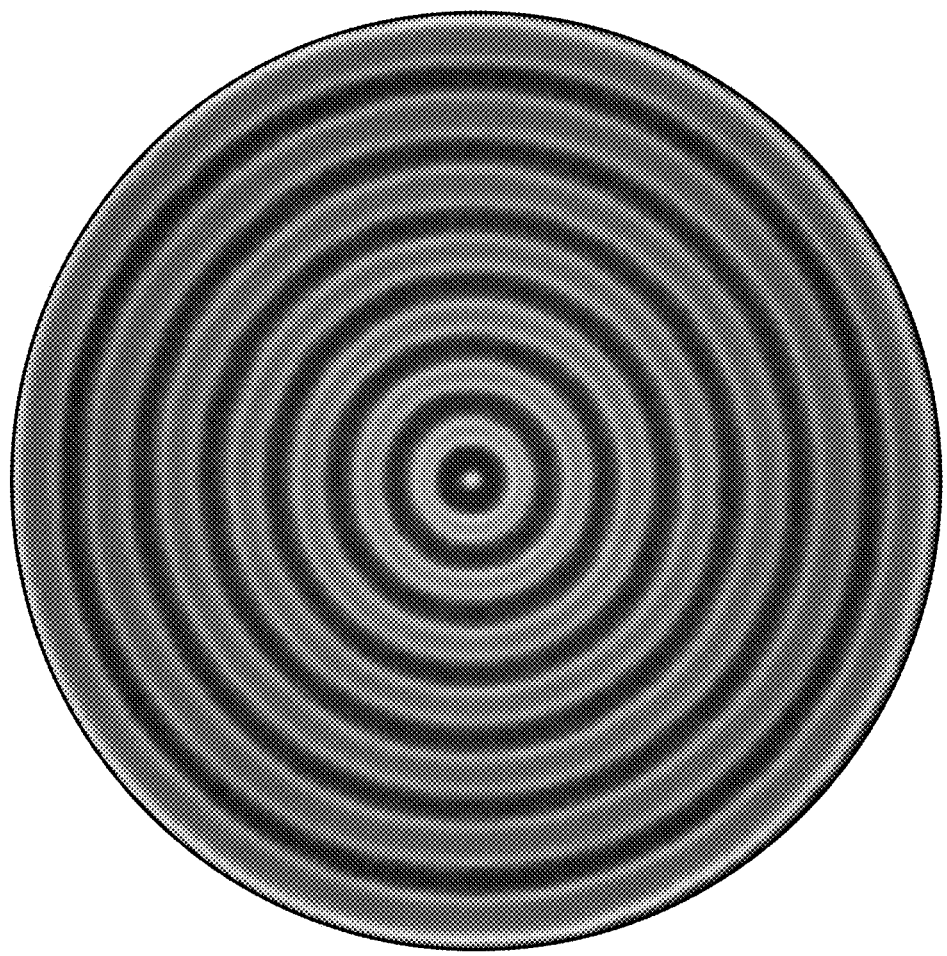
FIG. 7 is an SEM image of a single cylindrical or "bull's-eye" graded grating structure which is a radially symmetric extension of the linear plasmonic gratings depicted in FIG. 10.

FIG. 5 illustrates one embodiment of a top view schematic of a transmission-type width-graded plasmonic grating disposed on a substrate or a detector element. The structure is pieced together from grooves of gradually changing width while the periodicity of the grading, i.e. the edge to edge distance is constant.

Figure 8:
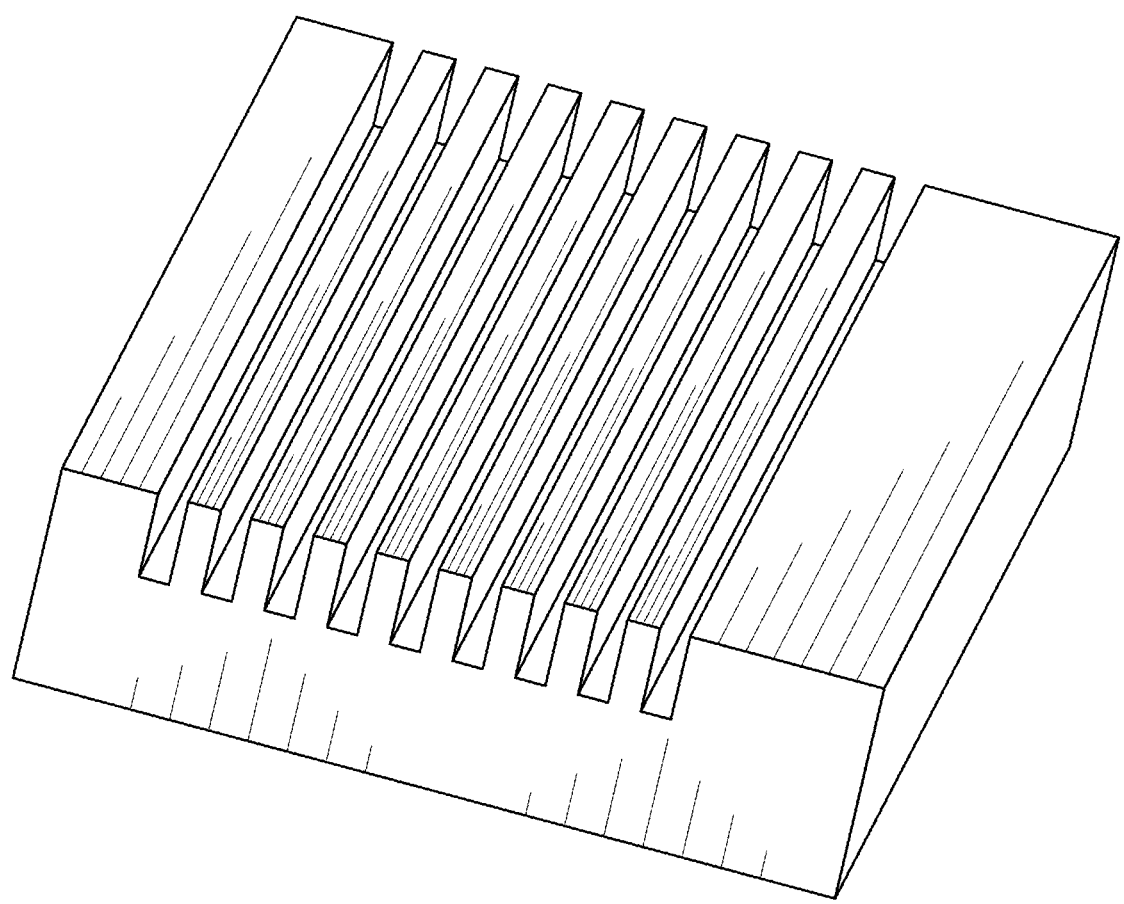
FIG. 8 is a top view schematic of a closed-ended plasmonic width-graded grating trapping red light selectively when excited by red light.
Figure 9A:
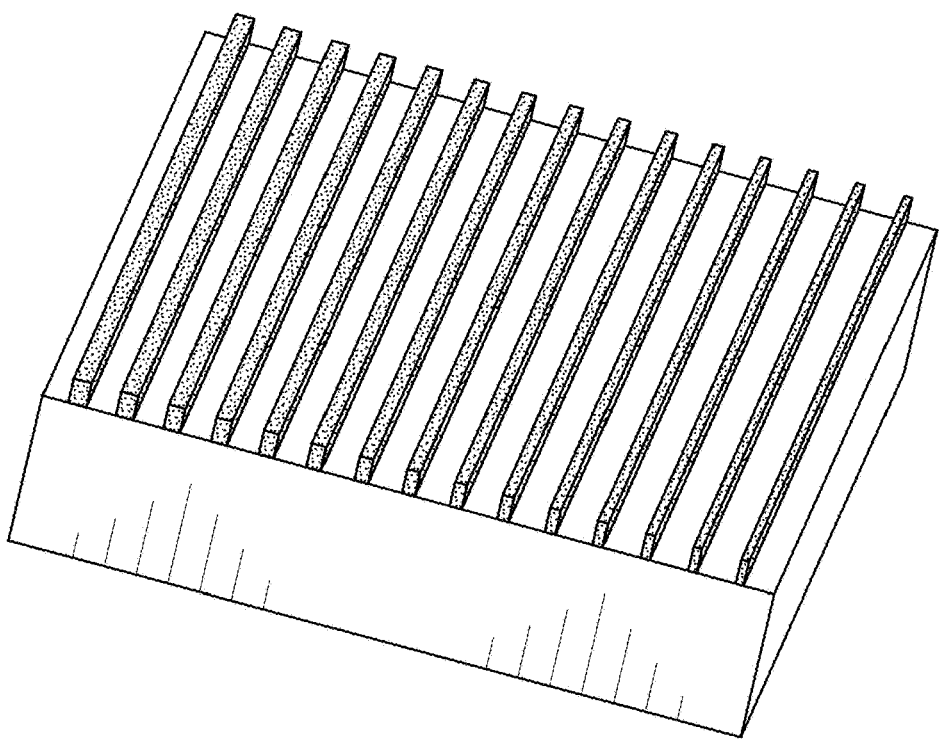
FIGS. 9A-9D depict a top perspective view schematic of a method of making a closed- or opened-ended width-graded plasmonic grating with different width-to-height ratios.
Figure 9B:
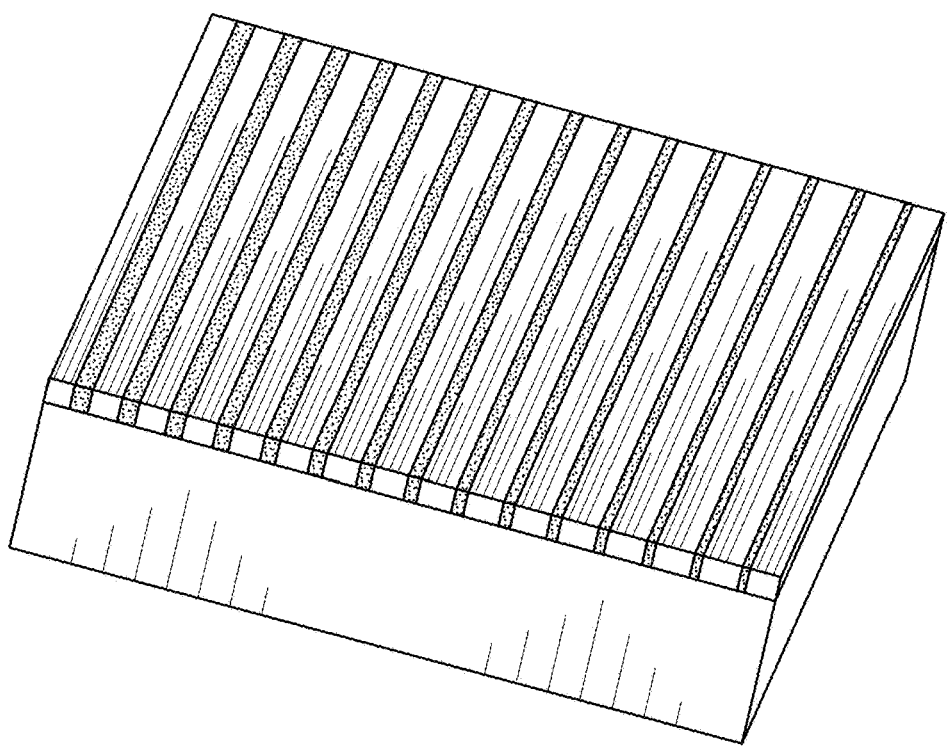
Figure 9C:
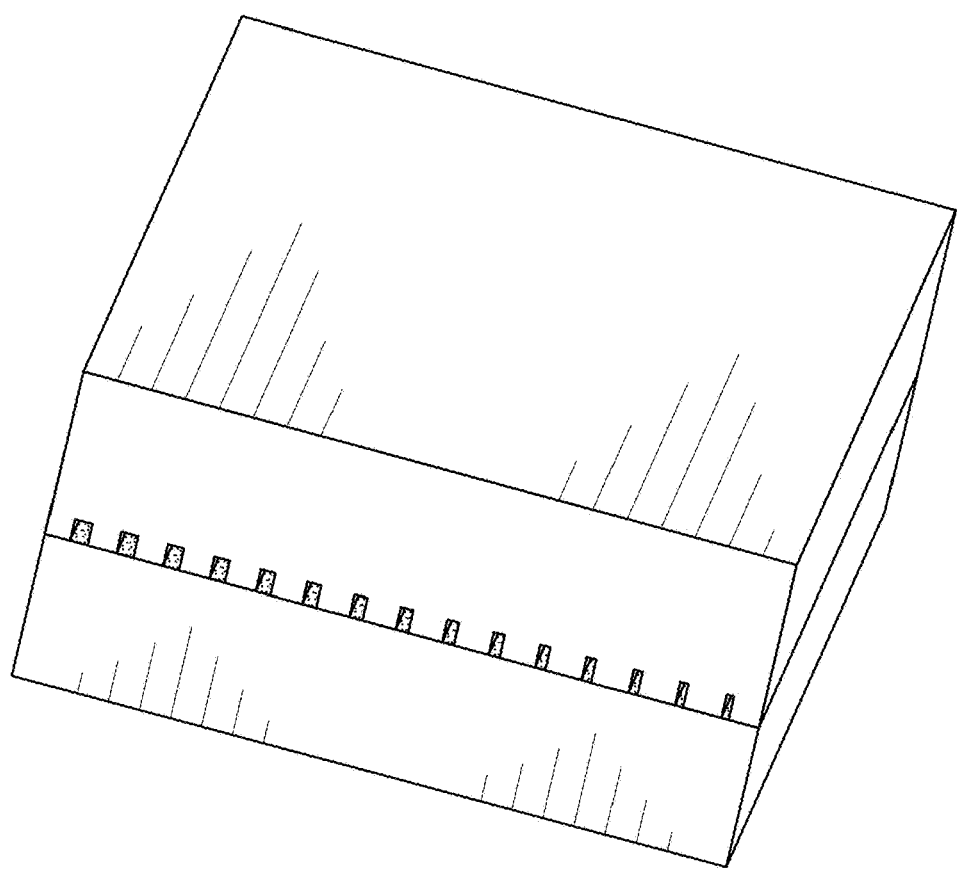
Figure 9D:
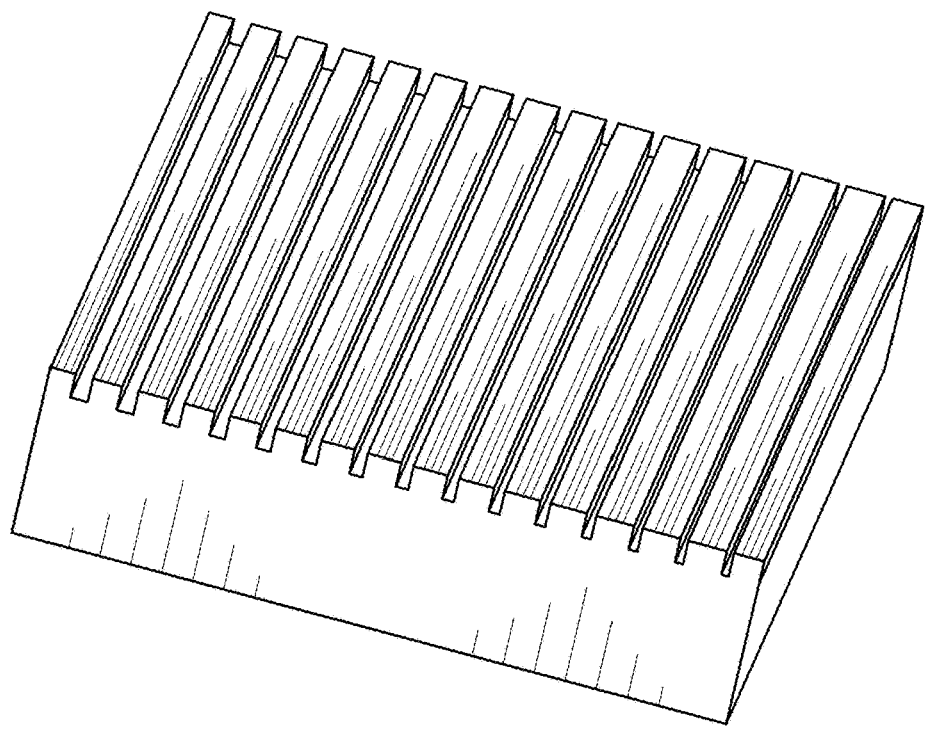

FIG. 8 illustrates a closed-ended plasmonic grating. FIG. 8 further illustrates that p-polarized radiation (E-field in the z-direction) can launch surface plasmon polaritons (SPPs) traveling in the x-direction into the grooves, as well as SPPs traveling in the z-direction on the top surface between grooves. In narrow grooves when w ~ or <150 nm, SPP fields within the grooves overlap, resulting in coupling of SPPs on the sidewalls (shown as a squiggly line between two down-traveling SPPs facing each other on the opposite walls of the groove). Likewise, SPPs can become coupled through the metal when d is comparable in size, to the skin depth of SPPs in the metal. However, coupling through the metal requires still smaller d values ~25 nm, approximately the skin depth of SPPs in the metals in the visible and near infrared range.

FIG. 9A-D illustrate the creation of a width-graded closed-ended plasmonic grating. (A) On a prime Si wafer, HSQ resist is spin coated, exposed and developed, resulting in a series of fins as shown. (B) Gold is thermally evaporated over the fins to fully coat around the fins, and fill up the gaps. (C) Evaporation continues past the fins to form a continuous film behind the grating with a typical film thickness of ~150 nm. (D) A thin film of epoxy is applied over gold layer, and peeled off to remove the grating formation from the Si substrate. The sample is then cleaned with HF to remove any residual HSQ which is converted to SiO2 and dissolved away.

Figure 10:
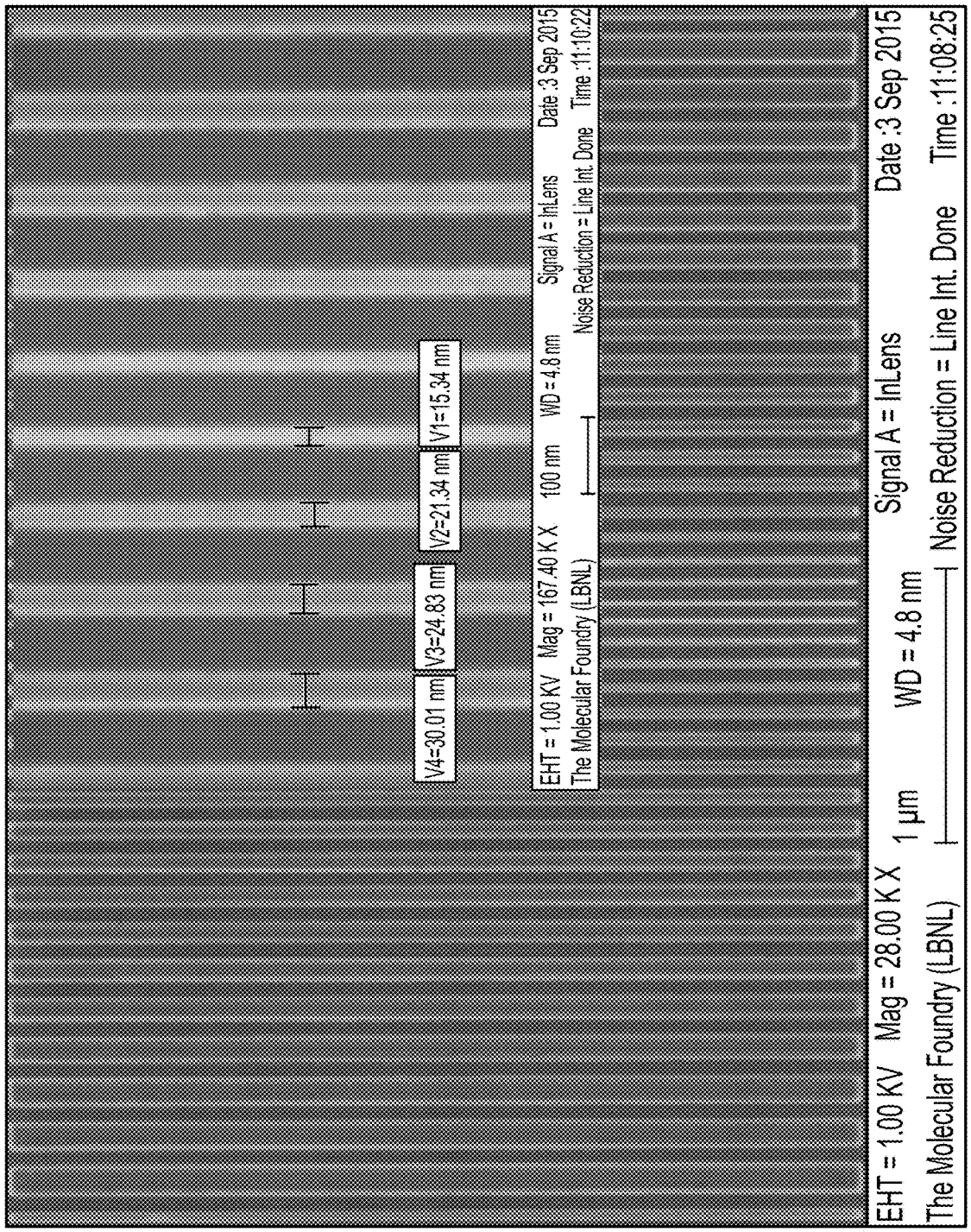
FIG. 10 is a top plan view SEM image of a width-graded plasmonic grating.

FIG. 10 is an SEM image of developed HSQ resist after EBL exposure. Line-features are consistently well-developed for dimensions of tens of microns in length and gap sizes as small as 10 nm. Depth (into the page) is 60 nm. Darker regions are where the resist has been removed, and the lighter shades of gray is where the resist remains. Inset: shows line-widths approaching single digit nanometers. Devices developed and imaged at the Molecular Foundry facility of LBNL.

Figure 11A:
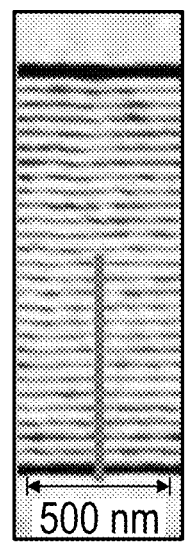
FIG. 11A shows an AFM image of a non-graded linear plasmonic grating.
Figure 11B:
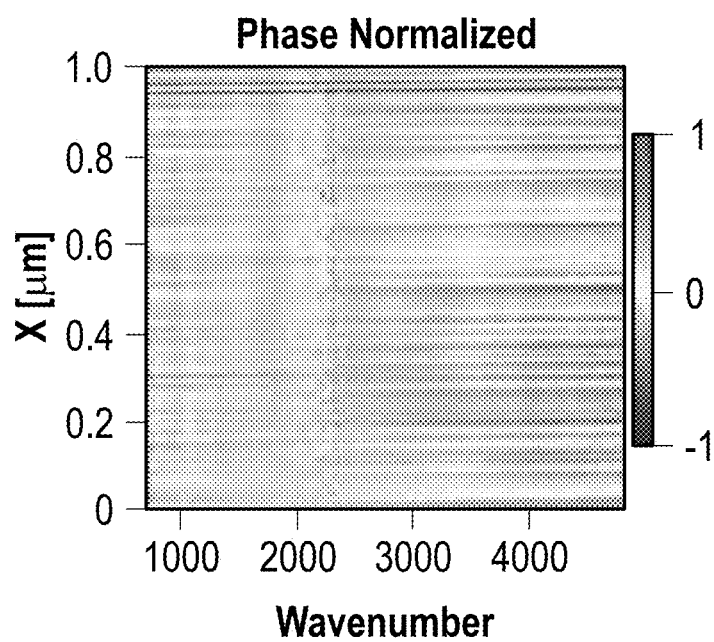
FIGS. 11B and 11C show resonance response curves acquired using a broad-band synchrotron infrared light channeled through an AFM tip of the non-graded linear plasmonic grating depicted in FIG. 11A.
Figure 11C:
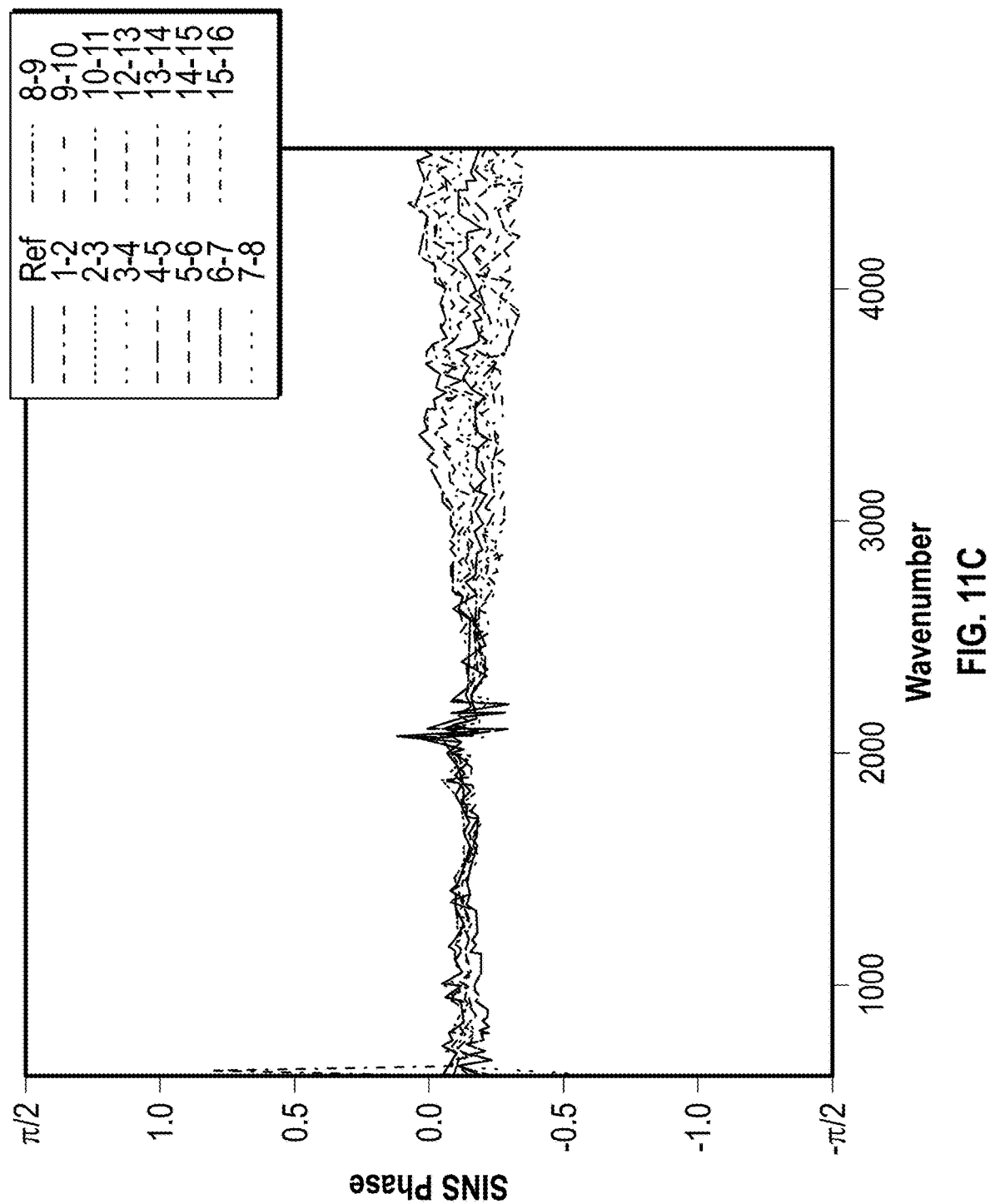

FIG. 11A-11C is a non-graded linear plasmonic grating shown with resonance response curves acquired by using the broad-band synchrotron infrared light which is channeled through an AFM tip. An AFM image of the linear grating structure is shown in the top left. The red line in the top left image indicates the path of the tip scan, which is comprised of 256 positions. While the tip dwells on each location in near-field, the infrared detector acquires 64 spectral in the mid-infrared region as indicated in in the x-axis depicted in the top and bottom right panels. Spatial distribution of the normalized total phase intensity is shown in the top right panel, and the phase spectra at approximately every tenth location along the line is shown in the right panel. FIGS. 11B and 11C indicate that the non-graded structure shown does not provide localized signal enhancement.

Figure 12A:
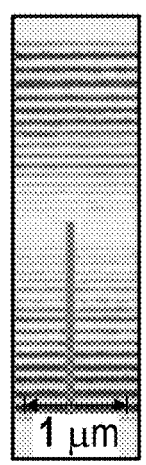
FIG. 12A shows an AFM image of a width-graded plasmonic grating.
Figure 12B:
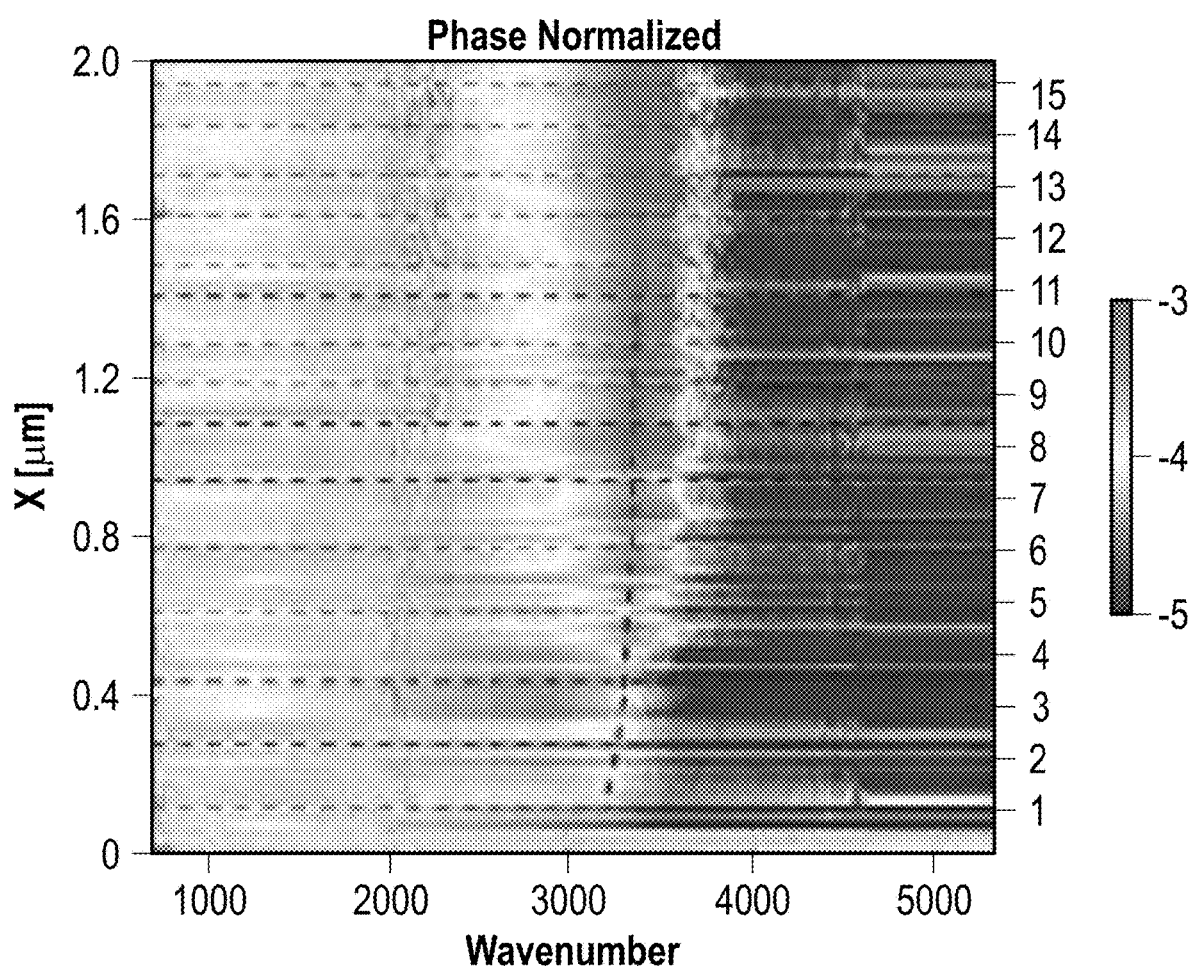
FIGS. 12B and 12C show resonance response curves acquired by using a broad-band synchrotron infrared light channeled through an AFM tip of the width-graded plasmonic grating depicted in FIG. 12A.
Figure 12C:
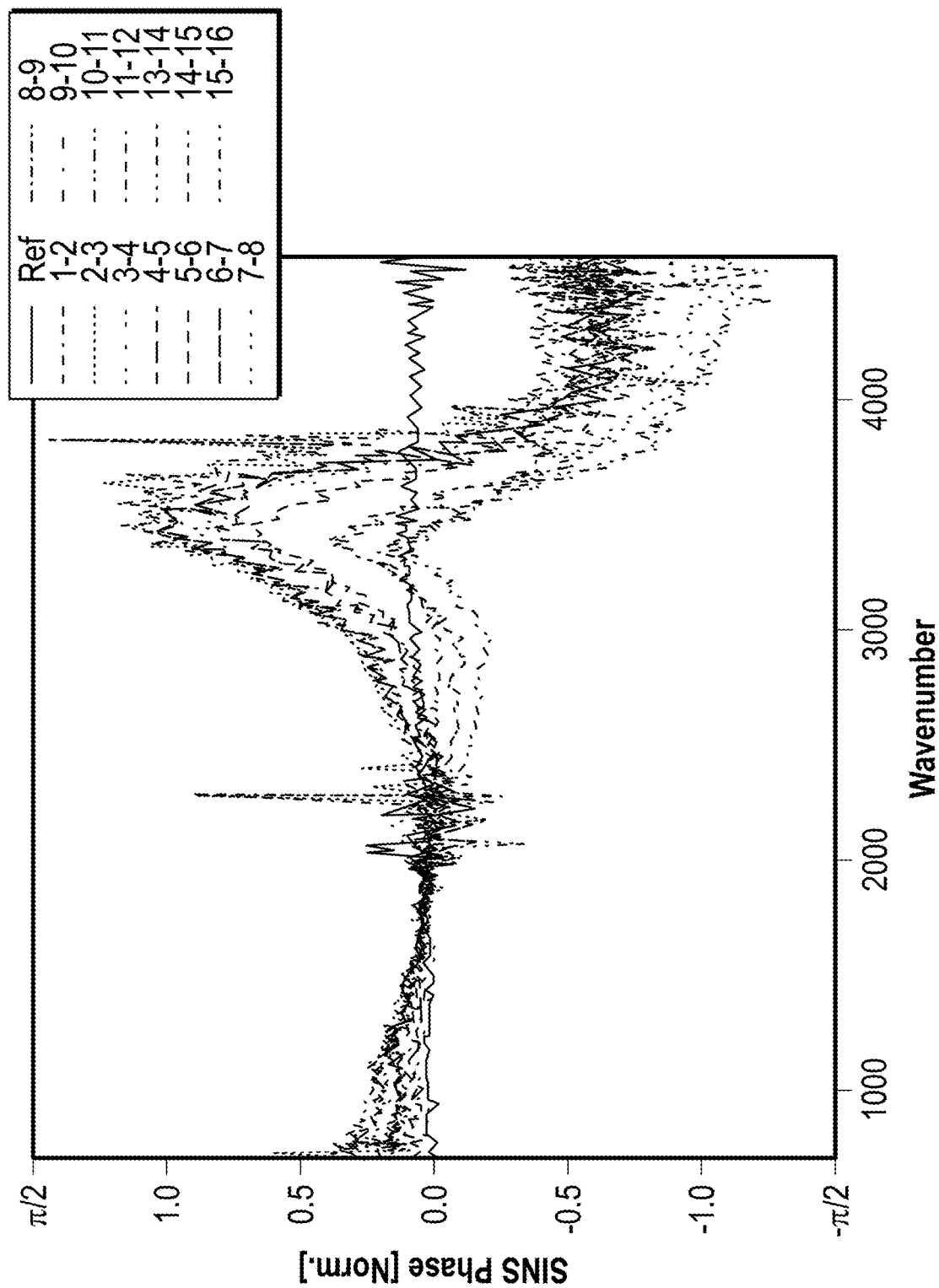

FIG. 12A-12C is a width-graded plasmonic grating shown with resonance response curves acquired by using the broad-band synchrotron infrared light which is channeled through an AFM tip. An AFM image of the width graded structure is shown in the top right. The red line in the top right image indicates the path of the tip scan, which is comprised of 256 positions. While the tip dwells on each point in near-field, the infrared detector acquires 64 spectral readings in the mid-infrared region as indicated in the x-axis depicted in the top and bottom left panels. Spatial distribution of the normalized total phase intensity is shown in the top right panel, and the phase spectra at approximately every tenth point along the line is shown in the right panel. FIGS. 12A and 12C indicate that the width-graded structure shown provides localized signal enhancement in the 2800-3200 $cm^{-1}$ region.

Figure 13A:
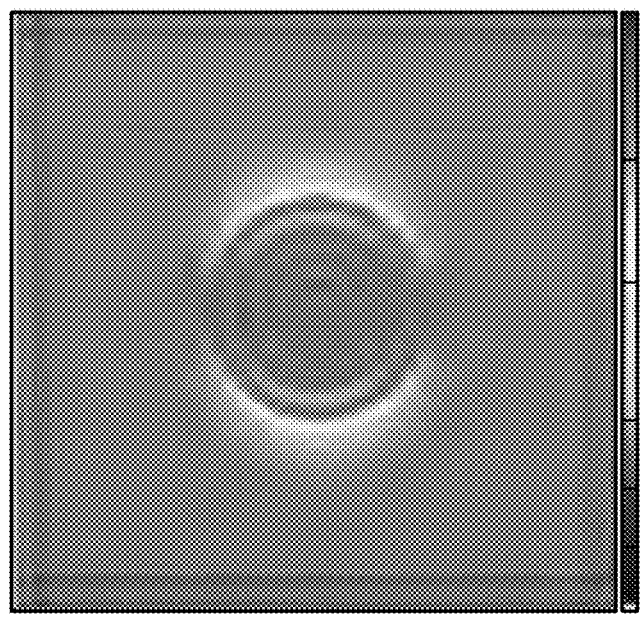
FIG. 13A is an image of a graded cylindrical or "bull's-eye" plasmonic grating structure.
Figure 13B:
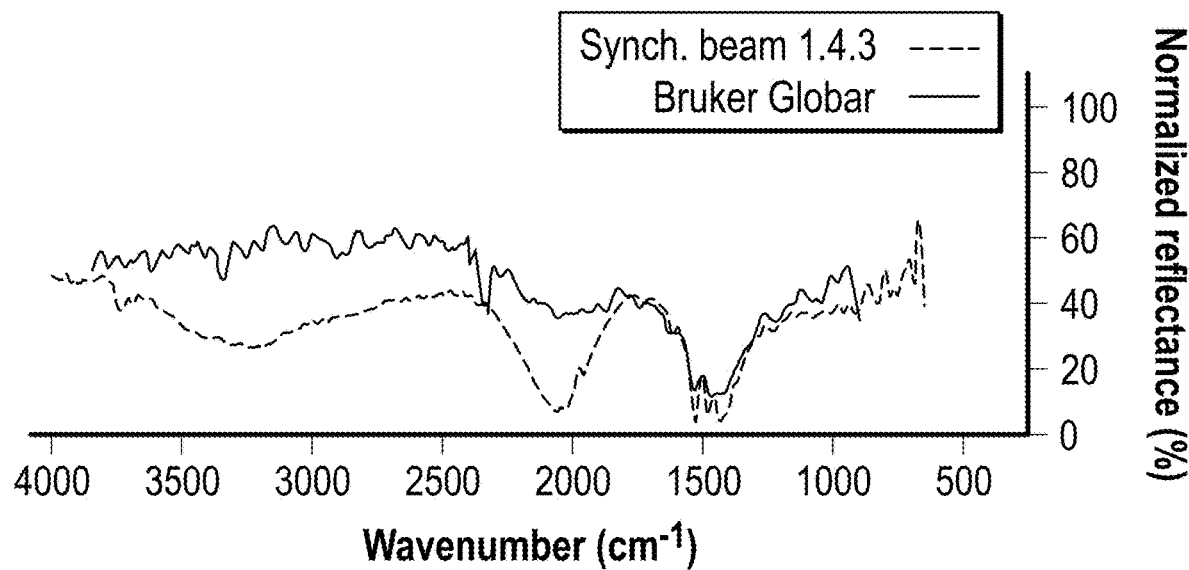
FIG. 13B is a graph that shows the resonance of the plasmonic grating structure shown in FIG. 13A using both an incandescent source as well as the synchrotron infrared radiation.

FIGS. 13A and 13B is a graph that shows the resonance of a graded cylindrical or bull's eye plasmonic grating structure using both an incandescent source as well as the synchrotron infrared radiation. This shows that the graded bull's eye structure provides localized signal enhancement in the 1500 cm$^{-1}$ region.

In some instances, plasmonic gratings may be used to conduct rapid and non-destructive molecular analyses capable of obtaining microbial information over the course of various biological stages directly from a sample without any intermediate sample preparation processes, for example such intermediate sample preparation processes may include nucleic acid/protein/lipid extraction and purification. In one example, a "Microbial Community Screening and Profiling" (MCSP) system, such as the MCSP system disclosed in U.S. Application No. 2017/0138845 to Birarda et al., incorporated herein by reference in its entirety, may be used in conjunction with the plasmonic gratings disclosed herein. Such MCSP-plasmonic grating system may allow complementary techniques to be performed on the same sample for a multidimensional analysis wherein electromagnetic waves are waveguided and localized to target specific microbial systems of interests such that a non-invasive and label-free chemical imaging technology that provides molecular information at micrometer spatial resolution in situ is accomplished. This hybrid system may take advantage of: (i) the sensitivity of infrared spectroscopy to the bond vibration frequencies in a molecule for determining molecular functional groups, (ii) the convenience of IR wave guiding plasmonic gratings to locate areas for molecular and composition analysis, and (iii) the about 104-106 fold increase in signal-to-noise provided by the plasmonic gratings.

Using photons in the mid-infrared region (about 2.5 to about 15.5 μm in wavelength, or about 4000 to about 650 cm$^{-1}$ in wave-number), this IR spectral microscopy may be successfully used to characterize microbial activities in not only geological materials and in hydrated and dried biofilms, but also may enable rapid and non-destructive (1) identification, (2) quantification of microorganism abundance (bacteria, archaea, etc.) within microbial communities of spacecraft associated surfaces, and (3) elucidation of entire microbial community functional relationships at a chemical level. Such a MCSP-plasmonic grating system may be a significantly powerful analytical technique due to the non-destructive nature of the methodology and the ability to rapidly analyze precious and hard to get samples, and may be utilized to calculate chemical signature abundance in samples, instead of total organic carbon metrics typically calculated from traditional methodologies. Furthermore, such MCSP-plasmonic grating systems may enable development of novel mid-infrared laser-based "miniaturized" life detection instruments in supporting future robotic and human space missions.

Figure 14:
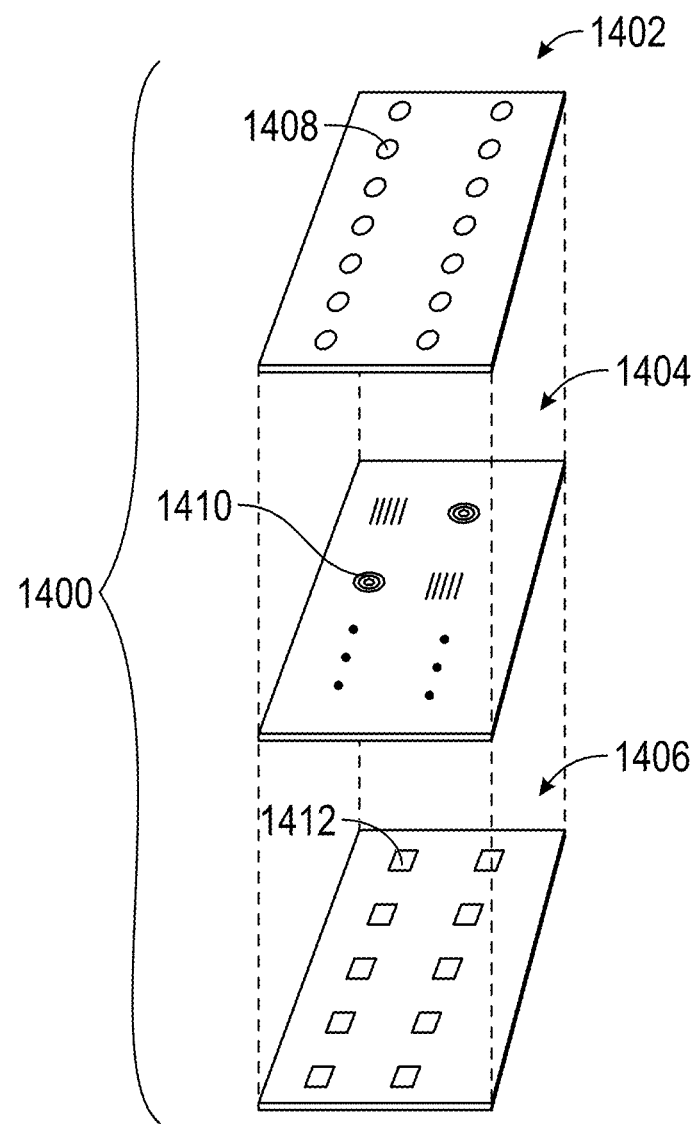
FIG. 14 depicts one embodiment of a droplet detection device comprising plasmonic grating structures.

In another instance, FIG. 14 depicts one embodiment of a droplet detection device 1400 comprising a sample holder 1402, a plasmonic grating substrate 1404, and a detector substrate 1406. The sample holder 1402 comprises at least one bin 1408 configured to contain an analyte. The plasmonic grating substrate 1404 comprises at least one plasmonic grating structure 1410. The detector substrate 1406 comprises at least one detector 1412. Disposed beneath each bin 1408 is a plasmonic grating structure 1410, and disposed beneath each plasmonic grating structure 1410 is a detector 1412.

The droplet detection device 1400 may be capable of high-throughput measurements of a large number of fluidic samples. In some embodiments, droplets of liquid comprising an analyte are placed in each bin 1408, an energy source is coupled to the liquid in each bin 1408, the analyte absorbs the energy source and gives of at least one signal, each plasmonic grating 1410 is structured to absorb a signal of interest from the signal, whereby each signal of interest is detected by each detector 1412. As multiple plasmonic structures 1410 are contained within the device 1400, multiple signals of interests may be detected from the fluidic samples. In some embodiments, the fluidic sample held by each bin 1408 is the same fluidic sample. In some embodiments, the fluidic sample held by each bin 1408 are from different sources. The device 1400 contains a multitude of plasmonic gratings 1410 with varying device architectures as previously described. Although device 1400 depicts varying plasmonic grating structures 1410, in some embodiments two or more plasmonic gratings 1410 of the device 1400 are of the same structure. In some embodiments, all the plasmonic gratings 1410 of the device 1400 are of the same structure. In some embodiments, each plasmonic grating structure 1410 is in contact with the sample holder 1402. In some embodiments, each plasmonic grating structure 1410 is configured to come into contact with the analyte during the operation of the device 1400. In some embodiments, at least a portion of each plasmonic grating structure 1410 is within the corresponding bin 1408. In some embodiments, the entirety of each plasmonic grating structure 1410 is within the corresponding bin 1408.

Figure 15:
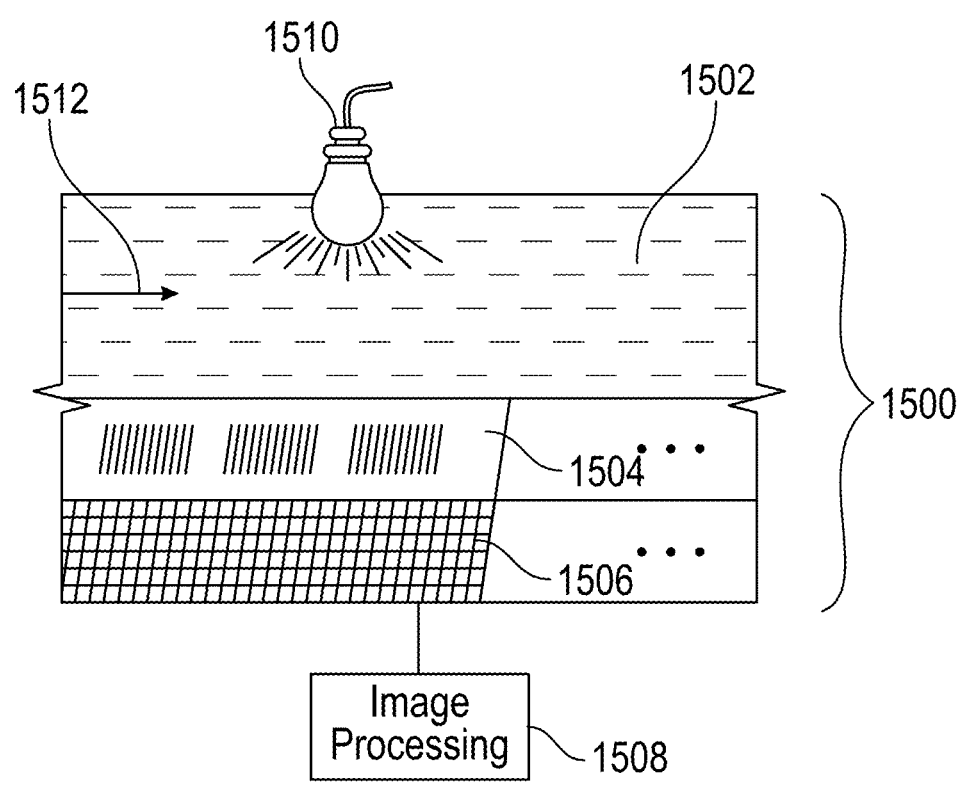
FIG. 15 depicts one embodiment of a microfluidic channel detection device comprising plasmonic grating structures.

In a further instance, FIG. 15 depicts one embodiment of a microfluidic detection device 1500 comprising a microfluidic channel 1502, a plasmonic grating substrate 1504 disposed beneath the microfluidic channel 1502, a detector substrate 1506 disposed beneath the plasmonic grating substrate 1504, and an image processing unit 1508 in electrical contact with the detector substrate 1506. The microfluidic channel 1502 is configured to flow a fluid 1512 through the microfluidic channel 1502, wherein the fluid 1512 comprises an analyte. The plasmonic grating substrate 1504 comprises at least one plasmonic grating. The detector substrate 1506 comprises at least one detector.

The microfluidic detection device 1500 may be capable of high-throughput measurements of a fluidic sample. In some embodiments, as the fluid comprising an analyte flows through the microfluidic channel 1502, an energy source 1510 is coupled to the fluid 1512, the analyte absorbs the energy source 1510 and gives of at least one signal, each plasmonic grating of the plasmonic grating substrate 1504 is structured to absorb a signal of interest from the signal, whereby each signal of interest is detected by each detector of the detector substrate 1506. As multiple plasmonic structures are contained within the device 1500, multiple signals of interests may be detected from the fluid 1512 as it flows through the microfluidic channel 1502. In some embodiments, more than one fluid 1512 sample may flow through the microfluidic channel. In some embodiments, the more than one fluid 1512 may flow through the microfluidic channel 1502 simultaneously. In some embodiments, the each fluid 1512 may flow through the microfluidic channel 1502 consecutively. In some embodiments, the plasmonic grating substrate 1504 contains a multitude of plasmonic gratings with varying device architectures, as previously described. In some embodiments two or more plasmonic gratings of the plasmonic grating substrate 1504 are of the same structure. In some embodiments, all the plasmonic gratings of the plasmonic grating substrate 1504 are of the same structure. In some embodiments, each plasmonic grating structure is configured to come into contact with the fluid 1512 within the microfluidic channel 1502 during operation of the device 1500. In some embodiments, each plasmonic grating structure is configured to come into contact with the analyte during the operation of the device 1500. In some embodiments, at least a portion of each plasmonic grating is within the microfluidic channel 1502. In some embodiments, the entirety of each plasmonic grating is within the microfluidic channel 1502.

FIG. 16A depicts one embodiment of a plasmonic nanofocusing probe 1600 comprising a plasmonic grating structure 1602 and a probe tip 1604 used on a nanofluidic platform 1610, and FIG. 16B is a magnified depiction of the probe tip 1604 and nanofluidic platform 1610 shown in FIG. 16A. Such a probe 1600 may be used to enhance the efficiency of nanoscale near-field energy delivery to the sample at the probe tip.

Surface plasmon polaritons (SPPs) in the mid-infrared region may lead to new opportunities for manipulating infrared light at nanometer scales. In the device shown in FIG. 16A, a portion of the energy source 1608 is absorbed by the plasmonic grating 1602 to create SPPs 1606, wherein the SPPs 1606 is configured to be launched on the facets of the probe 1600 and propagate to the probe tip 1604, wherein the intensity of the SPPs 1606 can be enhanced by two-to-four orders of magnitude on the probe tip 1604. Portions of the energy source 1608 that are not absorbed are scattered 1607. These strongly coupled SPPs 1606 reinforce each other by their overlapping evanescent fields. The SPPs 1606 are coupled from the probe tip 1604 to a sample, in this case the sample shown as a nanofluidic platform 1610. In some embodiments, samples besides the nanofluidic platform 1610 shown are used. The SPPs coupled to the sample are used to excite an analyte which gives off a signal 1624, that may then be detected by a detector 1622. Such a plasmonic nanofocusing probe 1600 may be used to bolster the detection sensitivity, radiation pattern, spatial resolution, and molecular specificity of analytes within samples.

The nanofluidic platform 1610 comprises a peptoid layer 1612 disposed over a fluid 1614, which is disposed over a sample 1616, which is disposed over nanochannels 1618.

In some embodiments, the plasmonic nanofocusing probe 1600 may be an atomic force microscope (AFM) probe. In some embodiments, the plasmonic nanofocusing probe 1600 may be a scanning tunneling microscope (SEM) probe. In some embodiments, the walls of the plasmonic grating 1602 may be tapered due to the narrowing of the probe from the probe base towards the apex of the probe tip 1604. In some embodiments, the energy source 1608 may be a broadband synchrotron radiation. In some embodiments, chemical speciation of the analyte at a molecular family level may be performed. In some embodiments, femtogram-to-altogram sensitivity of the molecular functional groups of the analyte may be performed.

What is claimed is:

1. A device comprising:
   a detector operable to detect photons, the detector comprising a complementary metal-oxide-semiconductor (CMOS) comprising pixels or a charge-coupled device (CCD) comprising pixels;
   a plasmonic grating comprising at least two walls, wherein adjacent walls are separated by a cavity, each wall has a thickness, and each cavity has a depth and a width, wherein the plasmonic grating is transparent, wherein the plasmonic grating is disposed on the detector, and wherein the wall thickness, the cavity depth, and the cavity width of the plasmonic grating are each tuned to absorb electromagnetic radiation and excite surface plasmons; and
   a sample holder comprising a bin configured to contain an analyte, an entirety of the plasmonic grating being positioned within the bin such that the plasmonic grating is configured to come into contact with the analyte during the operation of the device.

2. The device of claim 1, wherein the plasmonic grating is metallic.

3. The device of claim 2, wherein the metallic material of the plasmonic grating is selected from the group consisting of gold, silver, aluminum, and combinations thereof.

4. The device of claim 1, wherein the plasmonic grating is tuned to the infrared electromagnetic radiation range.

5. The device of claim 1, wherein the plasmonic grating is about 2 μm to 10 μm in length.

6. The device of claim 1, wherein the cavity width of the plasmonic grating ranges from about 10 nm to about 300 nm.

7. The device of claim 1, wherein the cavity depth of the plasmonic grating ranges from about 500 nm to about 20 μm.

8. The device of claim 1, wherein the plasmonic grating comprises at least three walls, and wherein the cavity depths the plasmonic grating are approximately uniform.

9. The device of claim 1, wherein the wall thickness of the plasmonic grating ranges from about 10 nm to about 300 nm.

10. The device of claim 1, wherein the detector comprises a low frequency infrared pixel, a medium frequency infrared pixel and a high frequency infrared pixel,
    wherein the low frequency infrared pixel is tuned to absorb electromagnetic radiation in about the $\lambda \geq 10$ μm spectral region,
    wherein the medium frequency infrared pixel is tuned to absorb electromagnetic radiation in about the $5\ \mu m \leq \lambda \leq 10$ μm spectral region, and
    wherein the high frequency infrared pixel is tuned to absorb electromagnetic radiation in about the $\lambda \leq 5$ μm spectral region.

11. The device of claim 1, wherein the plasmonic grating is rectangular or cylindrical.

12. The device of claim 1, further comprising a light source, wherein the light source is configured to direct light to the plasmonic grating.

13. The device of claim 1, wherein the plasmonic grating covers about 10 pixels of the detector.

* * * * *